Figure 1:
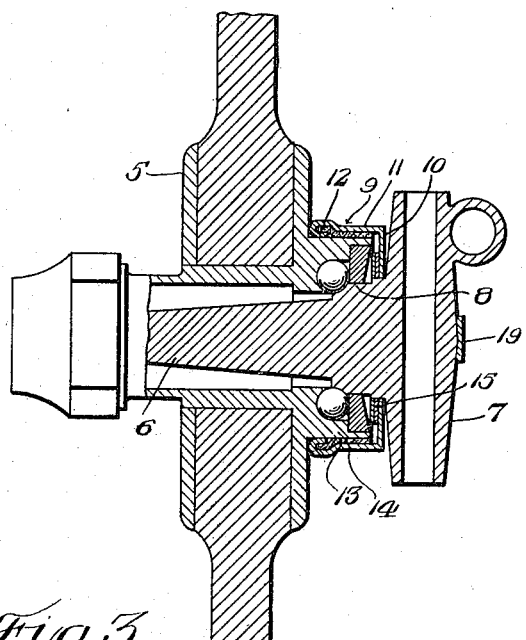

W. E. HUTCHINSON.
SAND BAND.
APPLICATION FILED FEB. 29, 1916.

1,209,585.

Patented Dec. 19, 1916.
2 SHEETS—SHEET 1.

Witnesses
J H Crawford
Edward Yeager

Inventor
W. E. Hutchinson,
By Victor J. Evans
Attorney

W. E. HUTCHINSON.
SAND BAND.
APPLICATION FILED FEB. 29, 1916.
1,209,585.
Patented Dec. 19, 1916.
2 SHEETS—SHEET 2.
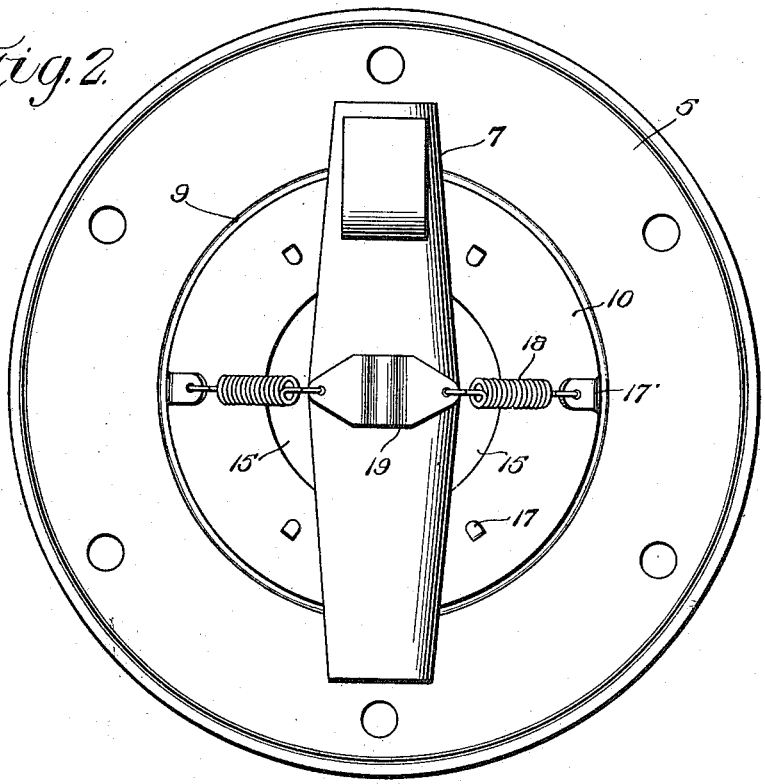
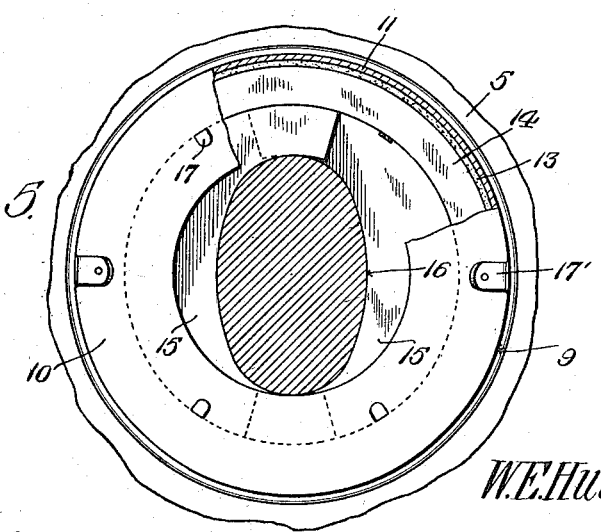
Witnesses
J. H. Crawford
Edward Geyger
Inventor
W. E. Hutchinson,
By Victor J. Evans
Attorney

UNITED STATES PATENT OFFICE.

WILLIAM E. HUTCHINSON, OF HARBORTON, VIRGINIA.

SAND-BAND.

1,209,585.

Specification of Letters Patent.

Patented Dec. 19, 1916.

Application filed February 29, 1916. Serial No. 81,253.

*To all whom it may concern:*

Be it known that I, WILLIAM E. HUTCHINSON, a citizen of the United States, residing at Harborton, in the county of Accomac and State of Virginia, have invented new and useful Improvements in Sand-Bands, of which the following is a specification.

This invention contemplates the provision of a sand band primarily intended for use in connection with the stub axle of a motor vehicle, although its general application is contemplated by the claims.

The principal object of the invention resides in the provision of a device of the above mentioned character, whereby the opening therein for the reception of the axle, may be reduced in size, with a view of providing a tight joint about the axle so as to prevent the admittance of dirt or other foreign matter into the hub of the wheel.

In carrying out my invention I also provide a novel construction of means for retaining the device fixed relatively to the axle in its applied position.

In the drawings forming part of this specification like numerals of reference indicate similar parts throughout the several views and wherein:—

Figure 3:
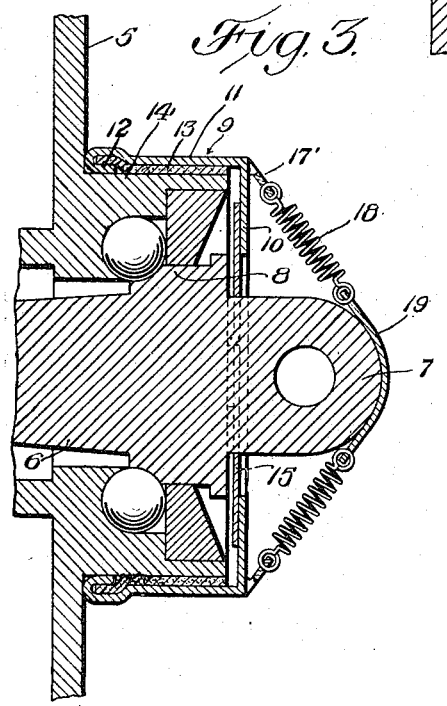
Figure 4:
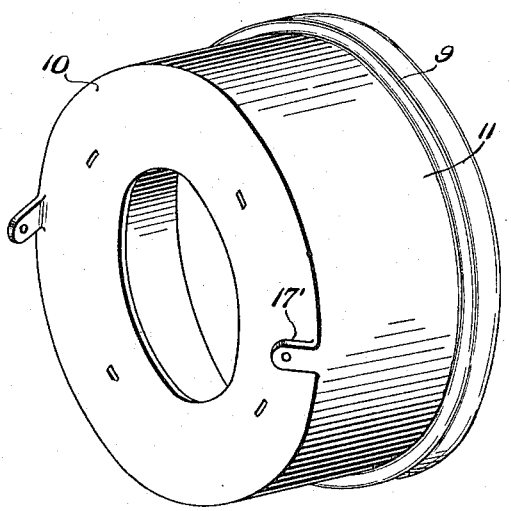

Figure 1 is a vertical sectional view. Fig. 2 is an elevation. Fig. 3 is a detail horizontal sectional view. Fig. 4 is a view of the device removed. Fig. 5 is a detail view of the plates.

While use of the invention in connection with a stub axle is sufficiently characteristic of its utility and admirably illustrates one of its most useful applications, the description being addressed to the coöperation of the device with such stub axle, I desire to have it understood that the device is applicable to other forms of axles and that such general application is contemplated by the claims.

Referring more particularly to the drawings 5 indicates generally the hub, 6 the stub axle or spindle of the knuckle 7, adapted to be fitted within a hub in the usual manner, the axle being provided adjacent one end with an integral cone 8 as shown.

The device forming the subject matter of my invention preferably consists of a cup-shaped member 9, the end wall 10 of which is provided with a relatively large opening for the reception of the axle 6, whereby the member is positioned upon the axle with the wall 11 disposed concentrically thereabout. The wall terminates to provide an inwardly extending flange 12 between which and said wall is clamped the packing 13 which may be of any suitable material, such as felt or the like. The wall 11 is adapted to encircle the portion 14 of the hub in spaced relation thereto, and with the packing 13 interposed between said wall and the portion 14 of the hub a tight joint is provided between these parts which obviously eliminates the entrance or admittance of dirt within the member 9 or the hub proper. It is of course understood that the axle 6 must be first removed from the hub, to permit of the member 9 being associated with the axle.

The opening in the end wall 10 must be of greater diameter than the diameter of the axle to facilitate the operative association of these parts, and with an axle of the type disclosed this opening is also of greater diameter than the diameter of the cone 8 which latter must also be passed through the opening in the end wall 10 of the member. With a view of reducing the size of this opening so as to prevent dirt or other foreign matter gaining access to the hub, subsequent to the operative association of the member 9 with the axle, I preferably make use of a pair of substantially crescent-shaped plates 15 which are adapted to be arranged within the cup-shaped member 9, and having their adjacent edges cut away as at 16 to conform to the configuration of the axle with which the device is used. These plates are provided with bendable lugs 17 which are adapted to be passed through suitable openings in the end wall 10 of the member and subsequently bent against the face thereof to hold the plates in proper position. When arranged within the cup-shaped member the plates 15 have their adjacent edges disposed in overlapped relation so as to provide a dust proof joint therebetween and the axle 6. It is of course obvious that the plates are arranged beyond the cone 8 of the axle as shown.

Projecting from the end wall 10 at diametrically opposite points are apertured lugs 17' with which is removably associated the adjacent end of the springs 18, the latter having their opposite corresponding ends connected with a link 19 bridging the knuckle 7, and operating to yieldably support the member fixed relatively to the axle, thereby holding the member against vibratory movement and rattling, which would otherwise be a source of annoyance.

The device is extremely simple in its make-up and can be quickly and easily applied to axles of any construction.

While I have herein shown and described what I consider the preferred embodiment of my invention I desire to have it understood that the size and configuration of the component parts of the device, as well as their relative arrangement may be changed when desired, within the scope of what is claimed.

What is claimed is:—

1. The combination with a vehicle stub axle including a knuckle, of a sand band associated with said axle, and means bridging said knuckle and connected to said band for holding the latter in operative position.

2. The combination with a vehicle stub axle including a knuckle, of a sand band associated with said axle, and yieldable means carried by said band and bridging said knuckle, whereby said band is held immovably fixed in operative position.

3. The combination with a vehicle axle, of a sand band including an end wall having an enlarged opening for the reception of said axle, means for reducing the size of said opening and effecting a dust proof joint between said end wall and axle, and yieldable means bridging the end of said axle for holding said band fixed relatively to the axle.

4. The combination with a vehicle axle and hub therefor, of a sand band comprising a cup-shaped member fitted on said axle and embracing said hub, an inwardly extending flange on one end of the member, packing clamped between said flange and member and concentrically disposed about the hub and means for holding said band fixed relatively to said axle.

5. The combination with a vehicle axle, of a sand band including an end wall having a relatively large opening for the reception of said axle, a pair of crescent-shaped plates engaging said end wall and having their meeting edges conforming to the configuration of the axle to provide a dust proof joint between said wall and axle, and yieldable means bridging the end of said axle, and connected to the band for holding said latter fixed relatively to the axle.

6. The combination with a vehicle axle having a fixed cone adjacent one end, of a sand band including an end wall having an opening for the reception of said axle, said opening being of greater diameter than the diameter of said cone, means providing a dust proof joint between said end wall and axle, and a yieldable means bridging the end of said axle for holding said band fixed relatively to said axle.

7. The combination with a vehicle axle having a cone adjacent one end, of a sand band including an end wall having an enlarged opening for the reception of the axle and said cone, a pair of plates interposed between said cone and end wall and providing a dust proof joint between said end wall and axle, means for holding said plates in operative position, and yieldable means bridging the end of said axle and connected to said band for holding said latter fixed relatively to said axle.

8. The combination with a vehicle axle, of a sand band including an end wall having an enlarged opening for the reception of said axle, a pair of plates arranged within said band, bendable lugs projecting from said plates and adapted to pass through openings in said end wall for holding the plates in engagement therewith, said plates having their meeting edges overlapped and shaped to conform to the configuration of said axle, whereby to provide a dust proof joint between said end wall and axle, and means for holding said band fixed in operative position.

In testimony whereof I affix my signature in presence of two witnesses.

WILLIAM E. HUTCHINSON.

Witnesses:
H. H. ADAMS,
STRATTON NOTTINGHAM.